United States Patent [19]
Dewkett et al.

[11] Patent Number: 5,646,676
[45] Date of Patent: Jul. 8, 1997

[54] SCALABLE INTERACTIVE MULTIMEDIA SERVER SYSTEM FOR PROVIDING ON DEMAND DATA

[75] Inventors: Thomas J. Dewkett, Staatsburg; William Todd Boyd, Poughkeepsie, both of N.Y.

[73] Assignee: International Business Machines Corporation, Armonk, N.Y.

[21] Appl. No.: 452,920

[22] Filed: May 30, 1995

[51] Int. Cl.$^6$ ............................................. H04N 7/173
[52] U.S. Cl. ............................ 348/7; 348/13; 455/4.2; 455/5.1; 395/200.09
[58] Field of Search ........................ 348/7, 12, 13, 348/6; 455/4.2, 5.1, 6.1; 395/200.09, 200.01, 200.03, 200.04; H04N 7/16, 7/173

[56] References Cited

U.S. PATENT DOCUMENTS

| | | | |
|---|---|---|---|
| 4,955,019 | 9/1990 | Mizuhara et al. | 370/85.7 |
| 5,191,410 | 3/1993 | McCalley et al. | 358/86 |
| 5,192,999 | 3/1993 | Graczyk et al. | 358/85 |
| 5,195,092 | 3/1993 | Wilson et al. | 370/94.2 |
| 5,208,665 | 5/1993 | McCalley et al. | 358/86 |

*Primary Examiner*—John K. Peng
*Assistant Examiner*—Chris Grant
*Attorney, Agent, or Firm*—Bernard M. Goldman

[57] ABSTRACT

Connects a host computer system (such as a mainframe or host server system) to a large multimedia (MM) distribution network having wide scalability without being limited by bandwidth constraints in the host system or in any multimedia controller for controlling "on demand" viewing of movies at a large number of set-top-boxes (STBs) with TV sets. Connected to the host system is a network distribution arrangement comprised of a plurality of multimedia (MM) adapters, each MM adapter containing a plurality of MM controllers, each MM controller being connected to a multiplicity of MM pairs, each MM pair being connected to the network for controlling a direct distribution of movies to a large number of STBs. Each MM pair includes a disk adapter and a network adapter connected by a common MM pair bus for transmitting disk data blocks directly to the STBs. The disk adapter controls and receives data from one or more disk devices. The network adapter sends the disk data to the network. In each MM pair, a pair bus connects the network adapter to transmit data from the disk adapter to the network. Data files (movies) are stored on the disks, and any file can be selected by an STB for transmission to the STB. Data blocks are read directly from the disk to the pair bus and then directly through the network to the requesting STB. Any STB may issue interactive commands to control a data file while it is being received.

16 Claims, 12 Drawing Sheets

| CONTROL BLOCK FIELD | START MOVIE | STOP MOVIE | REQUEST MOVIE | ACK START | MOVIE COMP. | USER REQUEST |
|---|---|---|---|---|---|---|
| DIRECTION | HOST TO MMC | HOST TO MMC | MMC TO HOST | MMC TO HOST | MMC TO HOST | STB TO MMC |
| HOST CMD | VALID | VALID | | | | |
| MMC CMD | | | VALID | VALID | VALID | |
| SOURCE | VALID | | | | | |
| DEST. | VALID | VALID | VALID | VALID | VALID | VALID |
| LENGTH | VALID | | | | | |
| FILE IDENTIFIER | VALID | VALID | VALID | VALID | VALID | VALID |
| REQ. CMD | | | | | | VALID |

FIG.5B

SCALABLE INTERACTIVE MULTIMEDIA SERVER SYSTEM FOR PROVIDING ON DEMAND DATA

INTRODUCTION

The invention allows a host computer system (such as a mainframe or host server system) to control a massive multimedia (MM) distribution system without being limited by bandwidth constraints in the host system. This invention enables a very large number of data users using network-connected devices (set-top-boxes STBs, with TV sets) to independently interact with the MM system in receiving requested data (e.g. movies).

BACKGROUND OF THE INVENTION

Public interest desires multimedia movies "on demand". But current data distribution systems are inadequate to handle mass distribution on demand. The "on demand" requirement means the distribution system must allow simultaneous independent and non-synchronous user selection and distribution of movies, allow each user to have independent control over reception of each requested movie.

Current computer systems can store large numbers of movies on tape, a smaller number of movies on fast access disk storage, and an even smaller number of movies in a computer's random access main storage. A single movie (which is a data file) may require 4 GigaBytes of digital data storage for its sound and video.

Current centralized movie distribution systems do not economically support massive simultaneous independent user viewing and control, and they do not economically compete with commercial VCRs (video cassette recorders).

Current transmission networks supporting large numbers of user devices (e.g. TV sets) only transmit unidirectional, and support synchronous transmission of movies. A single copy of a movie is transmitted to all TV sets, and no user control over the transmission is allowed, other than turning on/off of the reception of each movie. The lack of "on demand" viewing applies to both current airwave and cable TV systems.

Current computer-controlled "on demand" distribution systems have been proposed and tried, but they lack the ability to economically support mass "on demand" public viewing. A fundamental problem with such current systems is that they funnel all transmitted data through a single memory (usually a system "main memory" of a computer system), and such main memory buffer is a bottleneck to economical mass distribution.

For example, this is generally done by a computer reading blocks of data serially (one at a time) from a disk through an I/O subsystem into the computer's main memory, and then transmitting the blocks serially (one at a time) from the main memory to the network for distribution to the STBs. Each movie may have a single buffer in main memory from which each block is sent simultaneously and synchronously to all STBs which previously ordered the same movie (such as by telephone from an available movie schedule list).

Thus, each buffer transmits its content simultaneously to the TV network transmitting to all STBs which had scheduled the movie transmission. This synchronous transmission of each movie requires all requesting customers to start viewing the movie at the same time and to receive the same identically transmitted data of the movie. This is a "synchronized transmission" of one copy of each movie.

"On demand" viewing requires "non-synchronized bidirectional transmissions" for all interactive viewers of movies, in which each user controls his/her movie viewing independent of all other viewers—similar to user viewing currently obtainable with a VCR. "On demand" viewing applies to all viewers whether they are viewing the same or different movies. Many problems are involved with providing simultaneous independent non-synchronized bidirectional transmissions for all viewers.

Continuous viewing must be maintained for each viewer (no apparent transmission breaks in viewing) for the "on demand" distribution, except as commanded by each viewer using VCR-like controls such as START, STOP, REWIND, FAST-FORWARD, PAUSE, etc. while a movie is being viewed.

Conventional on-demand TV movie viewing for a limited numbers of viewers using Set Top Boxes (STBs) on a network use a host computer system. A selection menu table of movies in the host system is used by all users to independently select any movie in the menu. When a viewer selects a movie, a request is sent from his STB through the network to the host computer system for customer authorization, including customer validation and accounting functions, prior to starting transmission of the movie to the requesting viewer. Also, the host system locates a copy of the requested movie on a tape or disk drive. If the movie is found on tape, it may be transferred to a disk drive, which generally can provide better control over the network transmission process than can be obtained from a tape drive. The data is first read from the disk through an I/O subsystem (IOSS) into main storage, and then the data is read from main storage through an IOSS to a network adapter that connected to the network of the requesting STB. The network includes switching functions that receive a command from the host computer system to connect the network adapter to the requesting STBs. The host system checks the requesting STB's authorization.

The number of movies the conventional host system can concurrently supply is mostly limited by the bus bandwidth available for transmitting the independent movies to the requesting STBs. The independent copies of the transmitted movies (whether the same or different movies) compete for the memory bus bandwidth. Only one block of one movie can be transmitted on the memory bus at any one time.

Each movie being sent to a viewer requires a bandwidth of 0.2–0.5 megabytes per second (MB/s) of data transmission. In prior host/network transmission systems, all blocks of data must be read from disk through the IOSS, and written into the computer's main storage. Later, the blocks are read out of main storage through the IOSS to the network. Consequently, the prior host computer system had to twice move the movie data (once from disk, and once from main memory) in delivering the movie to the viewer.

However, other buses, which are serially connected to the memory bus, such as I/O buses, may put a severe constraint on the maximum number of independent movies which can be concurrently transmitted "on demand" to requesting STBs by conventional computer systems. An example of such a prior host computer system uses an IBM RS/6000 model 59H RISC host system. This system has 16 adapter slots on 2 microchannel buses for connecting adapters to a RISC processor. The 16 slots of the M59H system are equally divided between disk adapters and network adapters. Each adapter can handle a bandwidth of up to 10 MB/s. When designing the system to deliver movies from disks to a network through main memory, the total disk adapter bandwidth and the total network bandwidth were considered. At 4 GBs of memory storage per movie, and the high cost of memory storage, very few movies, could be delivered from memory storage by this prior art system.

When determining how many movies a host system can deliver, each transmission component of a system must be evaluated for possible bottlenecks. In the RS/6000 model 59H system, a continuous viewing capability at each requesting TV set is maintained by transmitting each movie on the network at an average 0.2–0.5 MB/s data rate. If each corresponding disk operates at the 2.0 MB/s rate with a disk adapter having a 10 MB/s bandwidth, the disk adapter (in the RS/6000 M59H) could support up to 5 disk drives operating simultaneously.

However, the bandwidth bottleneck in the M59H system is its two microchannel buses because each have only a bandwidth of 20 MB/s. In this example one microchannel bus is attached to disk adapters and the other microchannel bus is attached to network adapters. Since each microchannel bus has only 20 MB/s of bandwidth, each microchannel bus then can support only 10 disks operating simultaneously at the 2.0 MB/s rate. Thus each microchannel can support only 2 disk adapters operating at 10 MB/s and consequently 2 network adapters.

In the M59H example the system bottleneck is the microchannel buses and the system can concurrently handle a maximum of 40–100 movie requests, whether the transmission is supported by an on-demand protocol, or a synchronous protocol in which all requesting STBs being serviced are simultaneously receiving the same data without any interactive means available.

FIG. 2 represents the above described example of the prior art bottleneck in a multimedia data server computer system, using two separate I/O transmission paths through its main memory buffer to obtain I/O synchronization. Thus, it transmits data from disks 107 through its system main memory to network 108. Each of these two I/O paths requires a separate CPU command. The first command controls the transmission of the disk data along the first path comprising: one of disks 107, a connected disk adapter 201, a connected I/O bus 105, IOSS 104, system memory bus 103 into main memory 102, where the transmitted data is stored in a respective buffer. Then, a second CPU command controls a transfer of the data from main memory to an assigned network adapter 202, which is connected to network 108. A program running in CPU 101 issues these I/O commands which control the transmission of all movies from the disks 107 to requesting STBs connected to network 108.

In any prior art server computer, the data being transmitted from disk to main memory may encounter a bandwidth constraint at any internal component through which the data passes, such as I/O bus 105, IOSS 104, or the system memory bus 103. Because the data must travel both into and out of main memory, internal computer bandwidth requirements are double the movie data rate requirements of 0.2–0.5 MB/s. Different prior art server designs may have different points at which their internal resources have bandwidth constraints, limiting the number of movies which may be served at the same time.

In this example, the RS/6000 M59H system memory bus has 300 MB/s of bandwidth of which only 40 MB/s of the bandwidth can be utilized for the movie transmission operation. Accordingly, the bottleneck in the M59H system is its microchannel's maximum bandwidth of 40 MB/s. Its excess bandwidth of 260 MB/s cannot be used for movies and is wasted unless used for unrelated central processing operations.

When any prior computer system is used as a multimedia server that buffers movie transmissions through its main memory, it will have similar bottlenecks. Different prior computer systems have different bottleneck limitations which must be specifically evaluated by computer server designers.

SUMMARY OF THE INVENTION

The invention eliminates the prior bottleneck caused to "on demand" network transmission by bandwidth limitations of system memory buses and associated buses. The invention eliminates bandwidth limitations caused by transmitting movie data (and similar text/graphic data) through system memory buses and associated buses. Yet, the invention allows a host computer system to retain control over all movie transmissions in a large movie distribution network while relieving the host computer from transferring any movie data. The movie network transmission capability is not constrained by any host bus bandwidth limitation.

This invention also enables scalability of a multimedia system by enabling a single host computer system to support whatever number of the set-top-boxes (STBs) may make simultaneous requests for "on demand" movie transmissions.

Further, this invention enables the host system's resources to remain free of network data, so that the host resources are able to be used by the host computer system for other purposes, as well as for controlling the network operations. As a consequence, this invention allows the number of concurrent movies being played to be expanded by at least an order of magnitude and more likely by plural orders of magnitude, and conceivably can support thousands of STBs supportable by a single host system.

To do this, the invention removes network data handling operations from the host system. Only network control operations are retained by the host system over network data transmissions. The invention provides a control hierarchy having one or more multimedia (MM) adapters, each containing one or more multimedia controllers (MMC) to exercise further control over the network data transmission operations. Each MMC connects to a plurality of "MM pairs" which directly transmit the data from selected disks to the network. A scalable (expandable) number of MM pairs are supported by one MMC. The scalability of MM pairs is further expandable by allowing any number of MMCs to be operated by a single MM Adapter. The scalability of MM pairs is still further expandable by allowing any number of MM Adapters to be connected to a single host system.

Each MM pair has a "pair bus" which directly connects the multimedia disk adapter to a multimedia network adapter in the pair. The MM network adapter connects the pair bus to a network having a large number of requesting STBs. Thousands of STBs may be controlled by a single host computer system having a MMC controlling a plurality of MM pairs (with their plurality of pair buses). The host system is not unduly burdened by being relieved of transmitting network data, and the computer system may be doing unrelated work during most of its operational time, and its internal buses present no constraint on the number of movies that may be handled by the network on an "on demand" basis.

Each conventional STB has an internal buffer for receiving a data block from the network, and for controlling the outputting of the data from the buffer to an attached TV set. The network block transmission rate is much faster than the STB buffer output rate, so that each data block is received into a STB buffer in a fraction of the time that the data in the block is consumed by user viewing of the movie on a TV set.

But the STBs and networks transmit both data and control signals to their assigned MMC through their MM pairs. Control commands are generated by the STBs and sent through the network to the MMC when the STB wants or needs service.

The MMC contains control logic in the form of a MM control microprocessor and MM control memory. Movie data does not pass through the MM control memory. The MM microprocessor and MM memory are only used to control the data passing through connected MM pairs. A relatively high limit exists for the maximum number of movie transmissions which may be handled by any one MM pair bus by interleaving multiple movie block transmissions through the bus in a serialized manner.

Host network control processing (NCP) is handled by a network control system which may be a program running in the host system, which receives each user request from the MMC for a movie transmission. The NCP determines: STB authorization to receive movies, which of plural MMC controlled disks has each requested movie, and the NCP executes other preliminary processes before a user request from an STB can be allowed to receive a movie transmission.

The MM command protocol involves having the MMC receive each STB start command containing a request for STB reception of an identified movie. The MMC passes the request to the host system to perform its processing. If the host system approves the request, it assigns a host CPU to send a CPU command to the MMC (which may be the same MMC which sent the request to the host, but the CPU command may be sent to any MMC controlled by the host system having a MM pair connectable to the requesting STB and having a disk containing the requested movie).

The movie start command from an STB enables the host CPU to determine user authorization, and if the user is authorized the host selects the disk containing the requested movie, sends a host command to an MMC to start the transmission through a selected MM pair. While viewing the movie, the STB may interactively send to the MMC new STB commands including START, STOP, REWIND, FAST-FORWARD, PAUSE, etc. to control the movie transmission to provide VCR functions similar to the TV control functions found with current commercial tape VCRs.

All STB commands pass through the network to an assigned (connected) MM pair, which passes the STB command to its MMC's microprocessor which then processes or passes the command to the host computer system. The MMC handles commands which do not require NCP processing in the host.

The bandwidth of the pair bus in each MM pair is designed to be larger than the bandwidth of the connected paired disk adapter or paired network adapter. A bandwidth matched to the adapters is needed to enable an unconstrained flow of interleaved data blocks from reading disks attached to the disk adapter, through the MM pair bus and its connected network adapter, to the network and the requesting STB. The data blocks in this transmission path do not pass through the MMC or the host computer system, and their transmission is not affected by any bandwidth constraints in either the MMC or host system.

Once a movie transmission is started to a requesting STB, the STB automatically maintains a continuous transmission of the movie for smooth TV viewing of the movie data by issuing a series of next block commands to the MM controller (transparent to the human user of the STB). The STB buffers each received data block, and performs any decoding, cryptography, metering, and control function as it outputs the STB buffered data to the attached TV set for viewing and sound. After the MMC processor receives the CPU command for starting the movie, it sets a flag field in the MMC memory indicating the authorization for this transmission so that the MMC processor can directly handle the processing needed to send a data block responding to the STB command without involving the host system in the processing of the next block commands. In this manner, the MMC processor, MMC pair, and STB cooperate to continue the data block transmissions until the entire movie is transmitted.

The STB generates a next block command whenever it senses its data buffer is soon to become empty of data. Then the STB sends a next block command control block and an interrupt signal to its connected MM adapter in time to allow for MMC processing the command to get the next data block of the movie early enough to maintain uninterrupted viewing on the TV set attached to the requesting STB. The STB's next block command contains at least: an identifier of the requested movie, and the network address of the requesting STB.

When the MM processor services the next block command, the MM processor responds by sending a pair of MM control commands to the associated MM pair: including a disk read command to the disk adapter and a network control command to the network adapter. The disk read command contains the disk address of the identified movie and the block address on the disk of the next data block to be read from the disk. The network control command contains a path address that locates a path through the network to the requesting STB which is to receive this next data block being transmitted.

The path address may use a path protocol which is interpreted in the network, for each block being transmitted through the network. For this protocol, the MM processor inserts path information into a prefix concatenated with each next data block to be transmitted by the network adapter. The prefix contains the path identifiers that enable each network switch to interpret the prefix and select the next leg in the path needed to transmit the data block on its way to the required STB.

Thus, each disk/network pair's data transmission rate is much higher than the STB data block consumption rate, so that many movie data blocks may be sent serially through any MM pair bus during the time that a single data block is being consumed by any STB. These relative data rates allow each adapter pair to time-multiplex plural concurrently-requested movie data blocks serially on the pair bus to the network while all requesting STBs are controlling movies which are being continuously viewed on TV sets without any visible interruption apparent to their respective viewers.

Each MM pair may be connected to one or plural disks concurrently and independently providing the same or different movies to requesting STBs in the network. A multiplexing process is done by the MMC processor for controlling a serialization of the transmission of the resulting data blocks through the pair bus, since the MM pair has only a single pair bus, which is a sequential resource that can only transmit one data block at a time.

This serialization on the pair bus is done by the MMC processor controlling its issuances of disk commands to the disk adapter in the MM pair, which controls each next disk read operation for the MM adapter pair, to allow only one disk data block at a time to be transmitted to the pair's bus. For example, this serialization may be done by enabling the reading of one next disk data block to the pair's bus when the end of transmission is signalled for the prior disk block's bus transmission.

The circuits in each MM adapter pair must operate fast enough to handle the data blocks coming from its disks through the pair's bus, including handling disk adapter commands for signalling the read operations from the disks and handling the network adapter commands to set up the required network paths to the STBs for the data blocks. One way the network adapter may do this is to prefix a path header to each data block received from the pair bus before sending it to the network.

Accordingly, the MMC and host CPU(s) can concurrently process and provide to the different MM pairs in a timely manner a large number of next block commands as they are being asynchronously received from a large number of requesting STBs.

Accordingly, a large number of STBs may be simultaneously controlling different movies being viewed on different Tvs connected to a large network, as the STBs are asynchronously communicating commands to an MMC processor on an as needed basis, for which each STB command provides a control block identifying the issuing STB and movie requiring service.

There may be many MMCs in one MM adapter, which may be mounted on a single board in an electronic box, in which the MMCs are connected to one or more I/O buses of a host computer system having one or more CPUs. Also many MM adapters may be mounted in the electronic box, in which each MM adapter may contain many MMCs, with each MMC connecting to a plurality of MM pairs. The MM pairs may be mounted on the same or on different circuit boards in the same or different electronic boxes as their connected MMCs. And, those MM pairs may be connected to disk drives located in the same or other boxes. Those same MM pairs may also be connected to one or more networks having paths to thousands of STBs, all independently operating in the "on demand" mode under control of a single host computer system to enable the STBs to be independently receiving and controlling concurrent receptions of movies.

In the above description of the invention, movies are used as an example of a plurality of data files. It is to be understood that any type of graphical and/or text data files of any size may be handled in place of movie data files. Likewise, STBs are used as an example of user controlled interactive I/O devices; however, this invention can likewise be used with other user controlled I/O devices such as personal computers, etc. In this manner, the invention supports "on-demand" data transmission to a large numbers of interactive I/O devices.

Although this invention supports "on demand" transmission of data files to all I/O devices connected to a network, the invention also supports restricting the "on demand" transmission to only a subset of I/O devices in the network, to allow other I/O devices in the network to operate synchronously for simultaneously receiving the same movie (without using the "on demand" feature of this invention). The latter case also supports having different synchronous subsets of I/O devices, in which each subset receives a different movie during the same time period synchronously within the subset.

SUMMARY OF DRAWINGS

FIG. 3 show a Multimedia Controller and connected plurality of Multimedia pairs all packaged within one Multimedia Adapter.

DETAILED DESCRIPTION OF THE INVENTION

Figure 1:
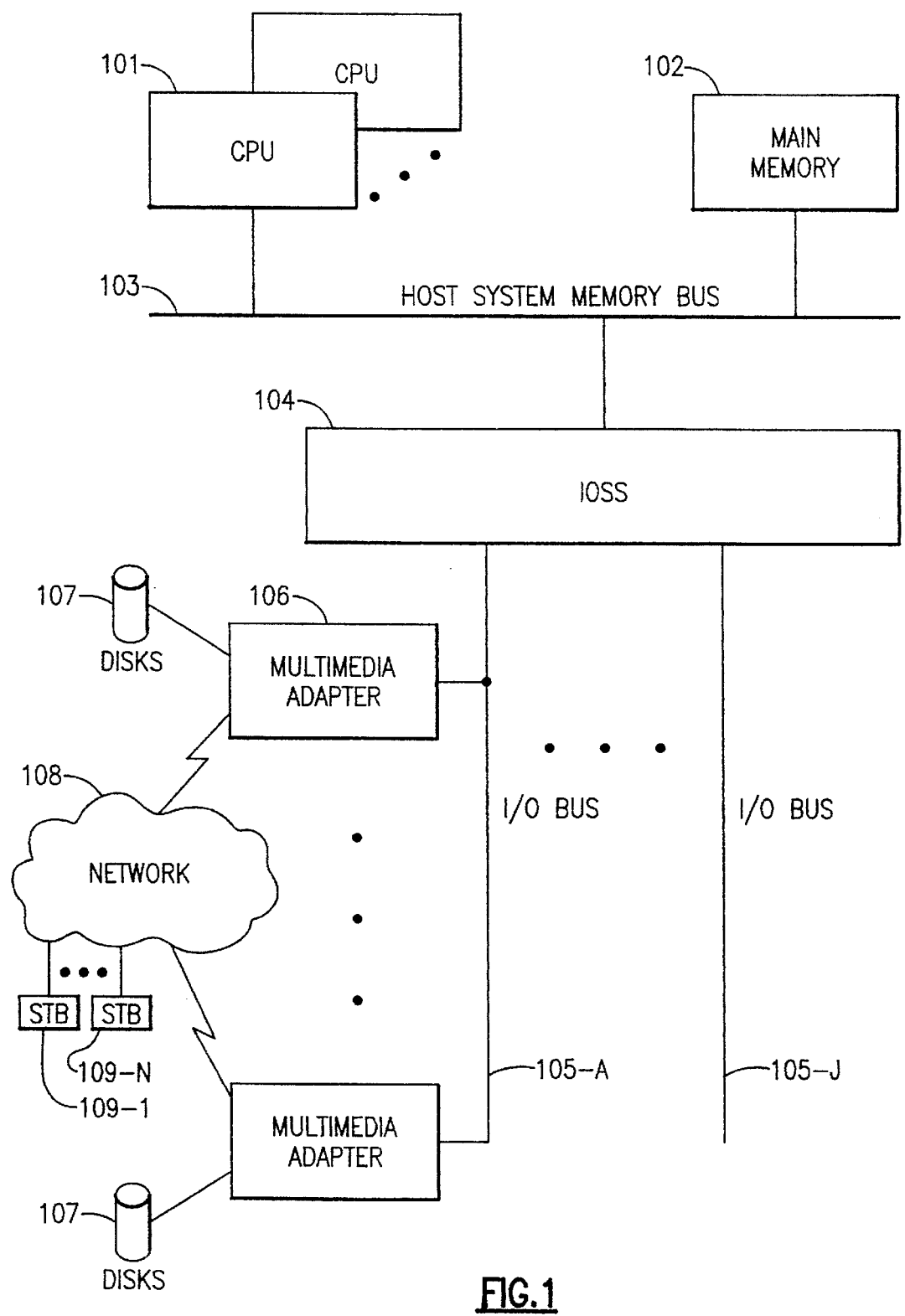
FIG. 1 shows a preferred embodiment of the subject invention, which provides a direct connection using novel Multimedia (MM) Adapters between storage disks and a wide bandwidth distribution network controlled by a conventional host computer system which includes CPUs, main memory, an Input/Output Subsystem (IOSS).

FIG. 1 illustrates an embodiment of a multimedia system containing the subject invention. It is controlled by a host computer system comprised of a plurality of Central Processors (CPUs) 101 which share a host system bus 103 connected to an IOSS (I/O Subsystem) 104 containing a plurality of I/O Buses 105 A through J.

One or more I/O buses 105 are connected to a plurality of Multimedia (MM) Adapters 106. Each Multimedia (MM)

Adapter 106 is connected to a network 108 having paths to a plurality of Set-Top-Boxes (STBs) 109 1 through N. Each MM Adapter 106 is connected to a plurality of disk drives 107.

Figure 3:
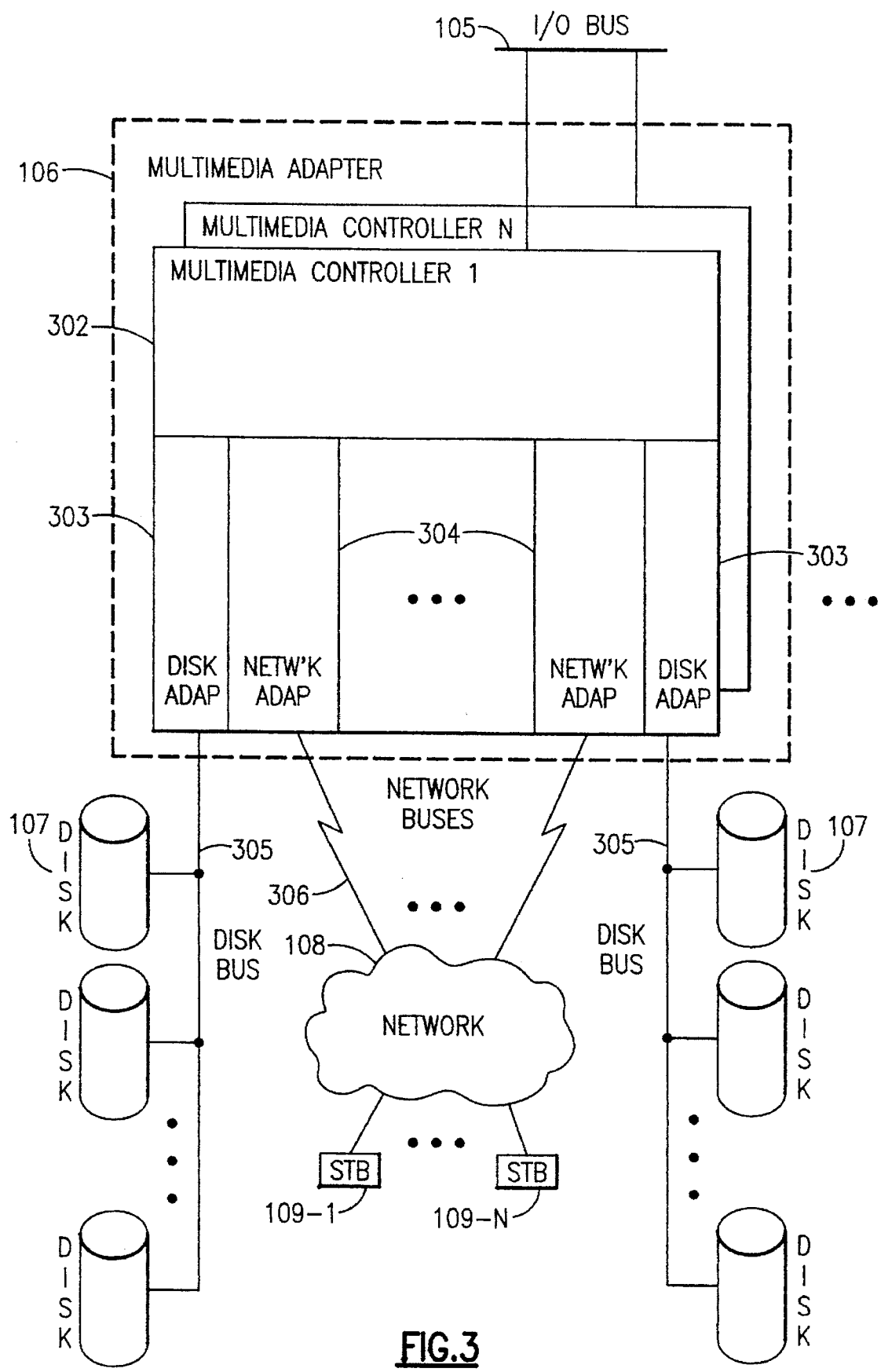
FIG. 3 shows a preferred embodiment that eliminates using a host computer system as the data distribution means between disk data and interactive network I/O devices, by off-loading the data distribution to one or more Multimedia pairs independently controlled by a Multimedia Controller connected to the host computer system. Each Multimedia pair contains a disk adapter and network adapter that directly distributes disk data to a network connected to the I/O devices.
Figure 4:
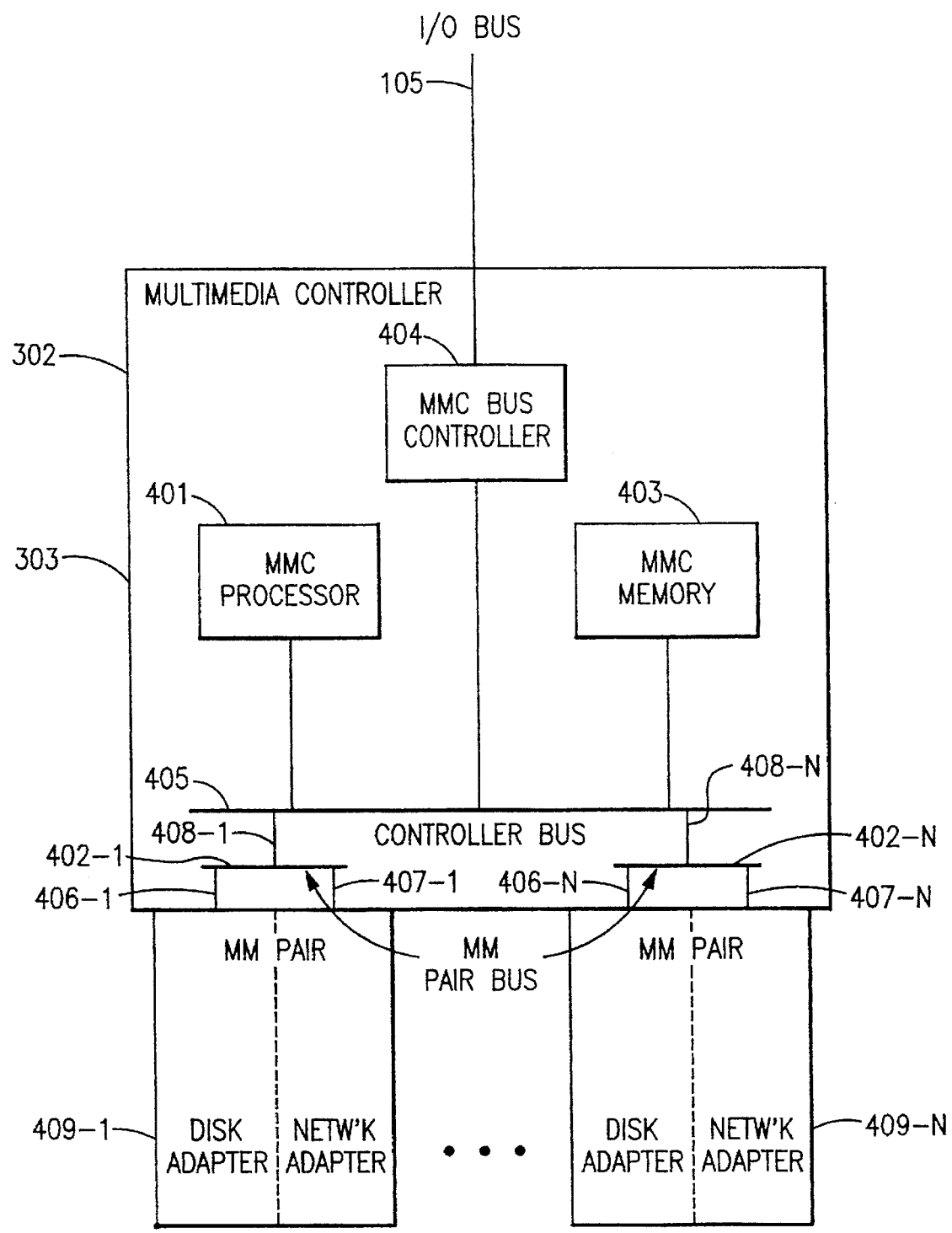
FIG. 4 shows the control signal flow structure in a Multimedia Controller (MMC) contained in any of the plural Multimedia Adapters 106 shown in FIG. 1. The MMC contains a MMC Bus Controller connected to an I/O bus 105 of the host computer system. The MMC also includes a Controller Bus 405 connected to a plurality of Multimedia Pairs 409. Each MM Pair Bus 409 connects a Disk Adapter to a Network Adapter to directly pass disk data to the Network Adapter received from any disk controlled by the Disk Adapter. The Network Adapter directly transmits the disk data to an I/O device connected to a network. Interactive control data received from connected I/O devices is transferred through the network adapter to the Controller Bus 405. Controller Bus 405 connects a MMC processor and a MMC Memory to the MMC Adapter Pair Buses.

The connections of each MM Adapter 106 to the disks 107 and to network 108 are by means of MM Controllers 302 and MM Pairs 303 and 304 are not shown in FIG. 1. But FIGS. 3 and 4 show the MM Controllers 302 and the MM Pairs 409. Each MM Pair 409 is comprised of items 303 and 304.

The host computer system (having one or more Central Processors (CPUs) 101 and main memory 102) is controlled by an operating system (OS) software under which Application Code software and Host Network System software operate. All of this software may be executing concurrently in different CPUs of the host computer system. The Host Network System software controls the operation of the Multimedia System disclosed herein.

Any of the host CPUs can execute (under control of a Host Network System program) to pass MM commands between main memory 102, bus 103, IOSS 104, and any I/O bus 105 to any multimedia adapter 106.

Some of I/O Buses 105 may be connected to conventional I/O devices, such as disk adapters, tape adapters, communications adapters, etc., while at least one of I/O buses 105 is connected to at least one MM Adapter pair 106.

MM network requests generally originate from set-top-boxes (STBs) 109-1 through 109-N supporting user television (TV) sets, and the multimedia pairs 409 are connected to the other end of the network. Any STB may send requests (by means of STB commands) to its connected multimedia controller 302 through its connected MM pair 409.

Each Multimedia Adapter 106 contains at least one MM Controller (MMC) 302 shown in FIG. 3. Each MM adapter 106 may contain any number of MMCs 302, and the MMCs may be connected to the same or different I/O bus 105. The I/O bus 105 connects each MMC to the host IOSS 104, which stores a command control block (sent with each MMC command) into the host main memory.

Each MMC 302 receives STB requests in the form of command control blocks, into which the MMC inserts an MMC command and sends it through the connected I/O bus 105 (under control of IOSS 104) with an interruption signal to the host CPUs.

If there are plural CPUs in the host computer system, any of the CPUs may accept the interruption signal and process the MM request from the MMC. The CPU processes the received MMC command and generates a corresponding CPU command that responds to the MMC command to control the STB requested transmission of each block of data from a disk 107 directly to the requesting STB 109, without having the disk data pass through the host computer system. The CPU processing checks the authorization of the requesting STB, controls the billing to the requesting STB, verifies that a disk associated with a selected MM pair contains the requested movie, and if not copy the requested movie to such a disk, and processes other related matters. When the CPU determines that the transmission of the requested movie should be allowed to the STB, the CPU must sends a responding command to the MMC connected to the identified MM pair.

Generally, the host system (via one of the host CPUs) is required to handle movie start and stop commands. The host system need not handle other commands used in the movie transmission, as they are entirely processed by the MMC associated with the MM pair performing the direct transmission of movie data from the selected disk 107 to the requesting STB 109.

Figure 2:
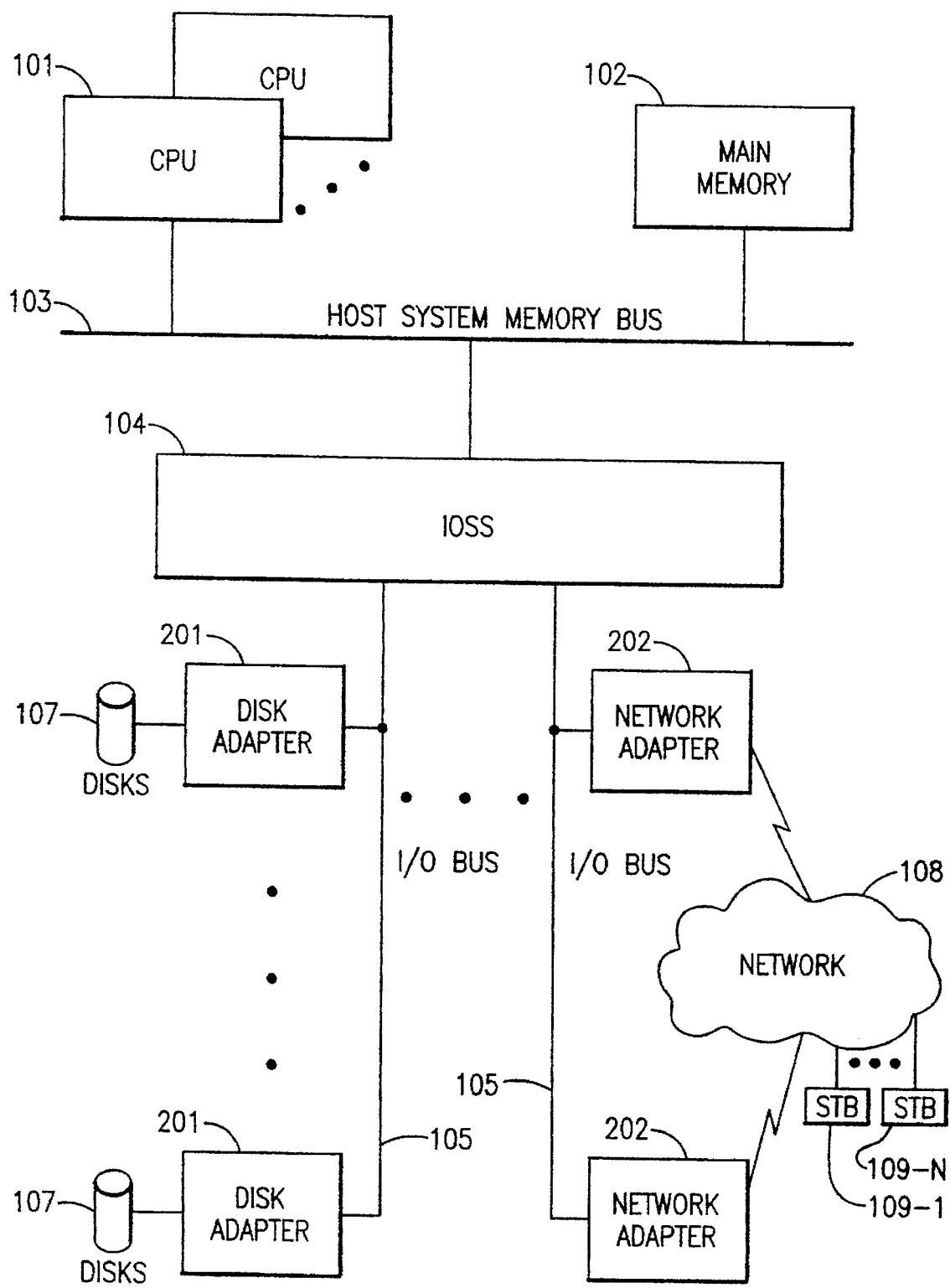
FIG. 2 represents a prior art system which uses a host computer system as a data distribution means between disk data and interactive network I/O devices.

Thus, with this invention, as shown in FIG. 1, the I/O buses, IOSS, CPUs, and electronic memory resources of the host system are not used for MM data transmission, so that the host computer system is not constrained by any MM bandwidth problem (in contrast with the prior type of system in FIG. 2 where the bandwidth of the host system directly limits the number of STBs which can be supported by the host system.

With this invention, the bandwidths of the buses in the host computer system (e.g. host memory bus and I/O buses) do not limit the rate of multimedia data transfers controllable by the host system, in contrast with the bandwidth constraint problems being the transfer rate limiting factor for the prior MM systems of FIG. 2. Thus, with this invention, the bandwidths in the host system have little affect on the multimedia performance by the subject invention. Accordingly, bandwidth constraints in the host system's I/O buses 105 and memory bus 103 do not affect the flow of disk data to the network because it is off-loaded from the CPU and MM adapters and MMCs to inexpensive MM pairs 409. Thus, any number of MM pairs 409 can be added or deleted later (along with any MMCs and MM adapters required to support added or deleted MM pairs) in a hierarchical manner in a MM network to obtain easy scalability of the MM network whenever required.

Accordingly, requested movies need never be stored in the host system's main memory 102, except perhaps momentarily in a process of copying a movie from one tape or disk to a disk associated with the MM pair which is to handle the data transmission in the process of executing a start movie command.

Thus, the invention supports "on-demand" transmission of data in the same or different data files (e.g. movies) to any network connected STB. "On demand" transmission enables each STB to independently control its reception of a copy of movie or other multimedia file. For example, each STB may start its reception of a movie at any time it wishes, so that its reception need not start simultaneously with the reception of any movie by other STBs. Any receiving STB may be fast-forwarding, or rewinding, its received copy of a movie, while other STBs may be viewing a different part of the same movie or doing any VCR-type control function with it.

FIG. 3 shows a layout of a multimedia adapter (MMA) 106. It contains at least one multimedia controller (MMC) 302, and may contain a plurality of MMCs. Each MMC is connected to one of the host's I/O buses 105, and more than one MMC may connect to the same I/O bus 105. Thus, MMA 106 may contain as many MMCs 302 as the host system needs to control all STBs on all networks assigned to the host system. Generally, a host system in a large central electronic complex (CEC) has the processing power needed to control a very large number of STBs (e.g. thousands, because the volume of commands to/from the host CPUs from the MMCs 302 will likely require only a small amount of host processing power.

Each MMC 302 is connected to and controls one or more multimedia pairs (MM pairs) 409 which contains one disk adapter 303 and one network adapter 304. The number of MM pairs connected to one MMC is determined by the total number disk drives and STBs which must be supported concurrently by the MMC processor.

The number of disk drives controlled by an MM pair 409 is related to the maximum number of STBs which can have data blocks serially transmitted fast enough over the connected MM pair bus to maintain continuous viewing of their respective movies at the receiving STBs, which is determined by the lesser of the disk or network adapter bandwidths since the adapter pair bus will be implemented to have a bandwidth greater than either the disk or network adapter.

FIG. 4 represents a preferred embodiment of an MMC 302. It is connected to one of the host's I/O buses 105 through MM bus controller 404 in the MMC 302. The MMC 302 also contains a MMC processor 401 and a MMC memory 403 which are also connected to the MM controller bus 405. MMC processor 401 may be a conventional microprocessor.

The plurality of MM pairs 409-1 . . . 409-N are also connected to controller bus 405; any number of pairs 409 may be connected to bus 405 through respective control bus extensions 408. Each control bus extension 408 connects through MM pair bus 402 to a conventional adapter control bus 406 in the disk controller 303 and to a conventional adapter control bus 407 in the network controller 304 in each MM pair 409.

Each MM pair 409 includes a disk adapter 303 and a network adapter 304. The disk adapter 303 connects to and controls one or more disks 107 (see FIG. 1). The network adapter 304 connects to network 108. Each disk adapter 303 may be a conventional disk controller for controlling a plurality of disks 107. Each network adapter 304 also may be a conventional network controller that connects network 108 to MMC 302.

Command signals between MMC processor 401 and each MM pair 409 are sent through bus 405 and its extensions 408 to/from a respective adapter control bus 406 or 407 in any MM pair 409 addressed by the command. STB requests (in command control blocks) are transmitted from a STB through a network adapter bus 407 of an associated MM pair 409, and through its bus extension 408 and MMC bus 405, from which the STB command control blocks are stored in the MMC memory. A MMC transfer-control command is sent by the MMC processor to the MM pair 409 receiving the corresponding STB command for each data transmission on the MM pair bus 402 requested by an STB.

The MMC processor receives all STB commands and handles them in first in first out (FIFO) order. This execution order by the associated MMC processor 401 controls the sequence of data transmissions through each associated MM pair bus 402 to all STB requestors of service to the associated MMC. The rate of command processing by the MM processor must stay ahead of the data transfer rate in each associated MM pairs 409, which must be fast enough to maintain continuous viewing of the movies at the Tvs connected to the requesting STBs. The maximum number of MM pairs 409 which can be handled by each MMC 302 is affected by the rate that the MMC processor can respond to the MM pairs with data block commands. STB requests for next the data block are sent through bus 402 to the MMC processor between data block transfers on bus 402 under control of an interruption signal received from the STB with each request.

FIG. 4 describes in more detail the multimedia controller (MMC) 302. The MMC 302 controls the reading of data (e.g. a movie) from a disk and delivers the data to the network via the network controller.

The MMC processor executes a control program stored in the MMC memory 403 to perform its network control functions. A MMC processor command controls disk controller's reading of data from its associated disks for the data to be sent over the pair bus 402.

The disk adapter 303 and network adapter 304 should have data transfer rates that match the rate for the pair bus 402 and the network transmission rate to the STB. Therefore the movie data rate for the data blocks flowing from a disk through the network adapter 304 will move at the lesser of the data rates supported by the pair of adapters 303 and 304. The maximum rate of data traffic on one pair bus 402 is the limiting factor in determining the maximum number of STBs which can be supported by one MM pair 409.

The speed at which the MMC processor 401 sends data transfer commands to the adapter pairs therefore controls the simultaneous data transmissions on the different pair buses 402 associated with the MMC.

A disk switch (not shown) may be connected between any disk and any disk adapter 303 in the different MM pairs 409. The disk switch enables the disk to be switched to any of plural disk adapters. Such disk switching enables a CPU to associate a disk (when required by a STB command) to an MM pair 409 required to perform the data transfer. Also, network switches may switch a network adapter 304 to a requesting STB required by a command.

Thus, a vast number of multimedia data transmissions may be simultaneously controlled by a single host computer system connected to one or more MM adapters, each containing one or more MMCs, and each MMC containing one or more adapter pairs 409.

Consequently, the total bandwidth enabled by this invention's use of plural data transfer buses (pair buses 402) may support multimedia data transmissions for a very large number of "on demand" STBs, which may far exceed (by an order of 100s or 1000s) the bandwidth resources found in any large mainframe computer system.

Figure 5:
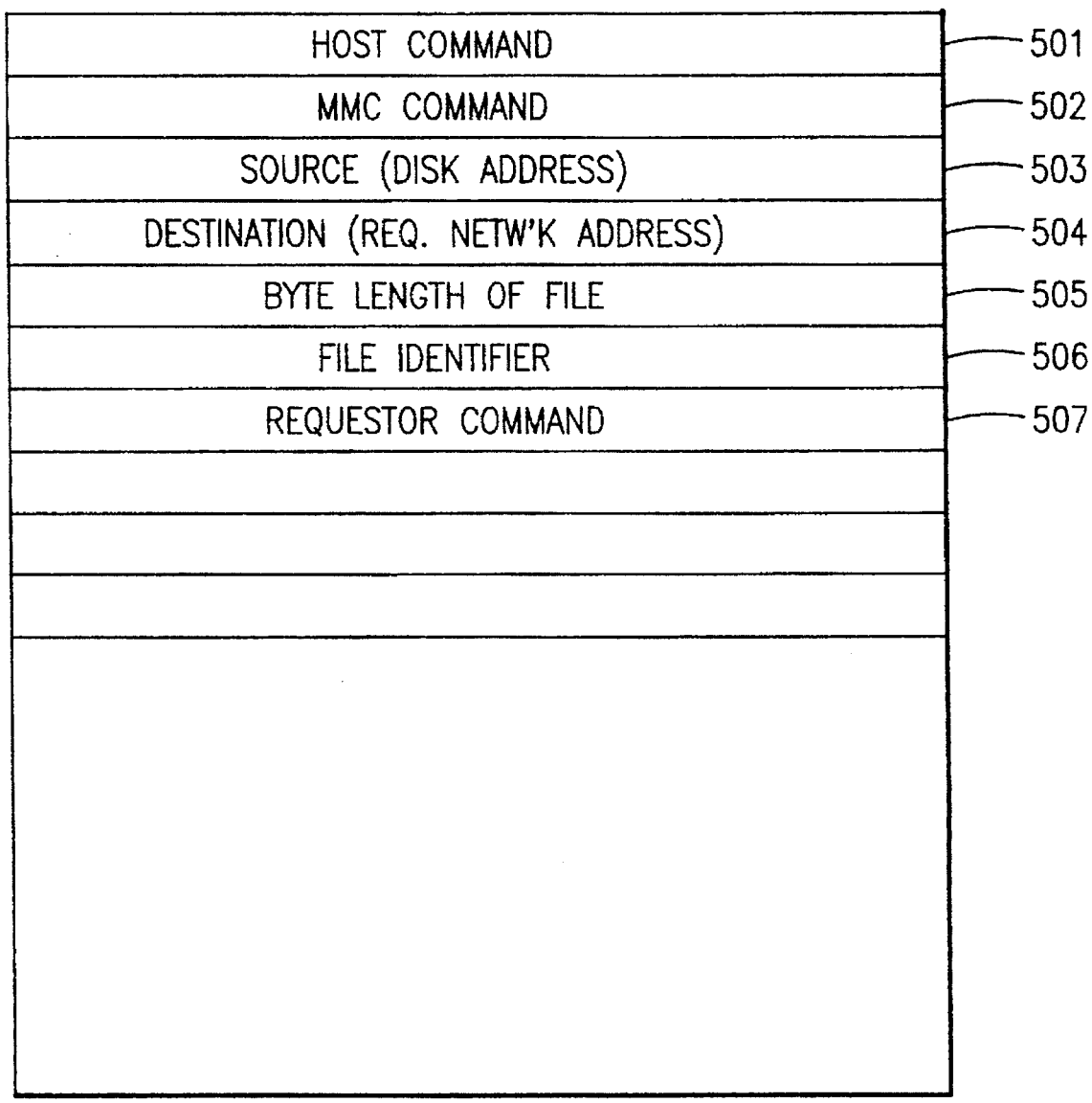
FIG. 5A shows a MMC Command Control Block structure for transferring control command signals between a requesting Set-Top- Box (STB), a host CPU, an MMC Processor, and an MMC Processor Memory.
FIG. 5B represents signals used in exemplary commands which may be executed in the multimedia system.

FIG. 5A represents a structure for Command Control Blocks used by the STBs, MMCs and CPUs for controlling STB requested operations. This command block is generated by any STB and sent to an MMC processor 401 which processes it, and also may pass it to the host computer system if it is a movie start or stop command.

Start and stop commands are also handled by the host computer system under a network control program stored in the host main memory. Other commands may not use the host system, and they may be executed solely by the MMC processor 401 using another network control program stored in the MMC memory 403. These programs control the execution of commands in the respective processors. These programs may be backed up on, and be paged from, one of disks 107.

A command processor in the MMC network control program processes the MMC commands and controls disk controller 303 and network controller 304 in each selected MM pair. Thus, the command processor may process a command control block received from a STB, and issue an MMC command to one of its disk adapters 303 to initiate the reading of a block of data of a requested movie stored on a selected disk 107. A corresponding network command may be concurrently generated and issued to the associated network adapter 304 to transfer the disk read data block from disk adapter bus 406 through pair bus 402 to network adapter bus 407 which sends the data block over the network to the addressed STB.

The STB send next block commands to network adapter 304 which forwards these commands to the MMC processor, which then generates the MMC commands for the next data block and sends them to disk adapter 303 and network adapter 304 until all data blocks in the movie have been transmitted. The command control program may control the transfer of disk data according to any current network protocol, such as by sending it in data packets. In this manner, the data will flow directly from any disk to the connected network to the requesting STB, without using any data transfer resource in the host computer system or in any MMC processor.

Therefore with this invention, the maximum amount of multimedia data which can be controlled by a host computer system has NO relationship to the amount of multimedia data which can be transferred under control of the host computer system. And, the MM command traffic in the host computer system for controlling the multimedia data transfers may require an insignificant amount of the resources of the host computer system. Accordingly, the host computer system operation may not be significantly affected by the multimedia data traffic on any or all of the paired data buses 402. Therefore most of the time, the host computer resources may be used for data processing operations unrelated to the MM operations.

The Command Control Block structure in FIG. 5A encapsulates signals used in all commands in the preferred embodiment. FIG. 5B indicates the fields used in the command control block by placing a "valid" to represent each field used in a command. Columns 2 through 7 (from the left in FIG. 5B) each represent a different type of MM command, and column 7 represents all STB user commands. Column 1 in FIG. 5B names the fields used by the commands represented in the other columns, except for the "direction" which indicates the direction of transfer (between the MMC processor and host or STB) for each command represented in columns 2–7.

The command control block is generated by any STB when it requests a service from the system. The control block is then transmitted from the STB over the network through the network adapter 304 in its MM pair 409 to the MMC processor 401.

In generating the control block, the STB places entries in control block fields: "destination" 504 receives the requestor's network address, "file identifier" 506 receives a movie number, and "requestor command" 507 receives the operation requested. In advanced designs of STBs, only the latter two field 506 and 507 need be keyed into the STB by the user, and the former field 504 is automatically placed by programming in the STB since its address is always the same for a given STB. The programming in the STB formats the contents in all of these fields.

All MMC commands are initiated by a user request command (see column 7). If the user wants to see a movie, the user keys information into the STB for at least the file identifier field 506 and requestor command 507. The STB generates a command control block containing this information (see column 4) adds the destination 504 and then sends the control block with an interrupt signal as a user request command to the MMC memory. The MMC processor fetches this block from its memory and inserts an MMC request movie command in the MMC command field 502 and sends it with an interrupt signal to the host system main memory. A CPU in the host system accepts the interruption, reads the block from the host main memory, inserts a start movie command in field 501, and performs processing needed to be done before any movie can be transmitted to any STB.

The CPU processing includes checking if the STB is authorized to receive the requested movie. To do this, the CPU looks up the STB in an authorization table in the CPU's main memory. If the user is found to be authorized, the CPU places a start movie command in the host command field 501, a movie start location in the source field 503, length of movie in byte length of file field 505 and sends the block to the MMC with an interrupt signal. The start movie command requests the MMC processor to send the first disk command to a disk adapter 303 in a selected pair 409 to start the transmission of the first data block of the identified movie to the network and the STB address in the command control block. The MM disk adapter 303 executes the disk command to read the first data block and sends it to the network adapter 304 via the pair bus 402 which sends it to the requesting STB.

A STB stop command also requires CPU processing to de-allocate the disk from which the movie transmission was made.

STB "inter-transmission commands" are issued by an STB while the MMC is handling a movie transmission (i.e. between the starting and stopping of a movie transmission). Most inter-transmission commands do not need CPU processing, since they can rely on the authorization and other CPU services performed in executing the start command as a prerequisite for the movie transmission. Examples of inter-transmission commands simulate well-known VCR functions, e.g. Fast Forward, Rewind, Pause, etc. These inter-transmission commands are user explicit commands (require keying by the user at the STB).

An implicit type of STB command is the "next block" command which is not keyed by, or other wise known to the user, but is automatically issued by programming (or circuits and/or microcode) in the STB for requesting each next block of data in the movie in time to maintain continuous viewing of the movie on the associated TV screen. The sending of each next block command is triggered by STB circuits (or microcode) which sense when the current data block being outputted by the STB to the TV has reached a point where the next block must be requested early enough to allow time to receive it for maintaining continuous viewing.

Cooperating network control programs (NCPs) in the host system and in the MMC storage perform different phases of interpretation on the fields in each command control block when it is being handled by a host CPU by the MMC processor 401. For example, the NCP processes a start command by a CPU checking the requesting STB's authorization, and determining if the STB is authorized to view the requested movie. If the CPU finds the STB is authorized, the CPU determines which disk contains the movie. If no disk has it the CPU copies the movie from tape to one or more disks associated with the MM pair 409 which is to handle the movie transmission. When the disk address is determined for the disk containing the movie, the CPU stores the disk address in the command's control block source field 503 and passes the control block to the MMC storage and sends an interrupt signal to the MMC processor to have it continue execution for the command. Then the MMC processor then executes the MMC's NCP to generate commands for the selected adapter pair 409 to control the transmission by the selected disk containing the requested movie specified in field 503 in the control block, and sends the commands to the selected adapter pair to start the transmission of the first data block of the movie to the STB indicated in the control block.

Thus MMC NCP interprets the fields in the command control block including the MMC command field 502, the File Identifier field 506 that identifies the requested movie, source field 503 containing the disk address which identifies the disk 107 and addresses the requested movie, length of the movie 505, and the STB destination 504. The NCP executed by the MMC processor then generates the commands for the adapter pair which will transmit the movie to the requesting STB. This NCP contains a predetermined size for each data block to be transmitted from a disk to the network, and the NCP uses the length field 505 (containing the number of bytes to be transferred in the movie) to determine when a command to the adapter pair is for the last data block of the movie to be transferred from the disk to the network, since it requires special operations. Destination field 504 (containing the STB Network Address to which the adapter pair 409 sends data blocks of the movie) is placed by the MMC processor into the command to the network adapter in the selected adapter pair.

The MMC NCP also processes the VCR-like STB requests. For a rewind request, it skips over a predetermined number of previous data blocks in determining the disk address (pointer) for the next data block to be transmitted. For a fast forward request, it skips over a predetermined number of later data blocks in the movie for determining the disk address (pointer) for the next data block to be transmitted. For a pause request, it repeats the pointer to last sent block in the movie for determining the disk address (pointer) for the next data block to be transmitted until the pause request is ended, and internal controls in the STB operate the pause effect on the TV screen.

Each transmitted data block contains both display and sound information which is provided to the STB for the attached TV set.

Figure 11:
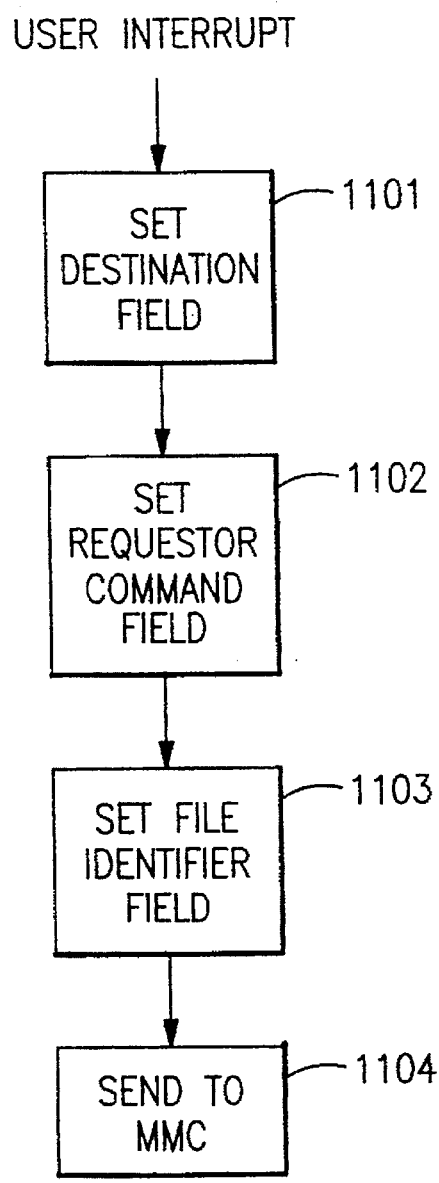
FIG. 11 and 12 is a flow diagram of processes performed in a STB for making user requests in an "on demand" Multimedia Network System.

FIG. 11 shows the control flow performed by an STB processor in each Set Top Box (STB) in the network for providing each user request. Steps 1101 through 1104 perform processor functions carried out when a user physically keystrokes commands to the STB—on a STB panel or on a STB remote control device (which may be on the TV's remote control device). Each STB command generates an interrupt and a command control block of the type shown in FIG. 5A. The interrupt signals an interruption to a control program being executed in the STB so that the process in FIG. 11 can be performed by the STB processor. In step 1101, the Destination Address is set into field 504 which is the address of this STB in the network. Step 1102 sets the requestor command into field 507, which may be a Start, Stop, Play, Pause, Fast Forward, or Rewind request for a movie. Step 1103 sets File Identifier field 506 with the identifier (ID#) of the desired movie. Steps 1101, 1102 and 1103 may be performed in any order in addition to the illustrated order.

Figure 9:
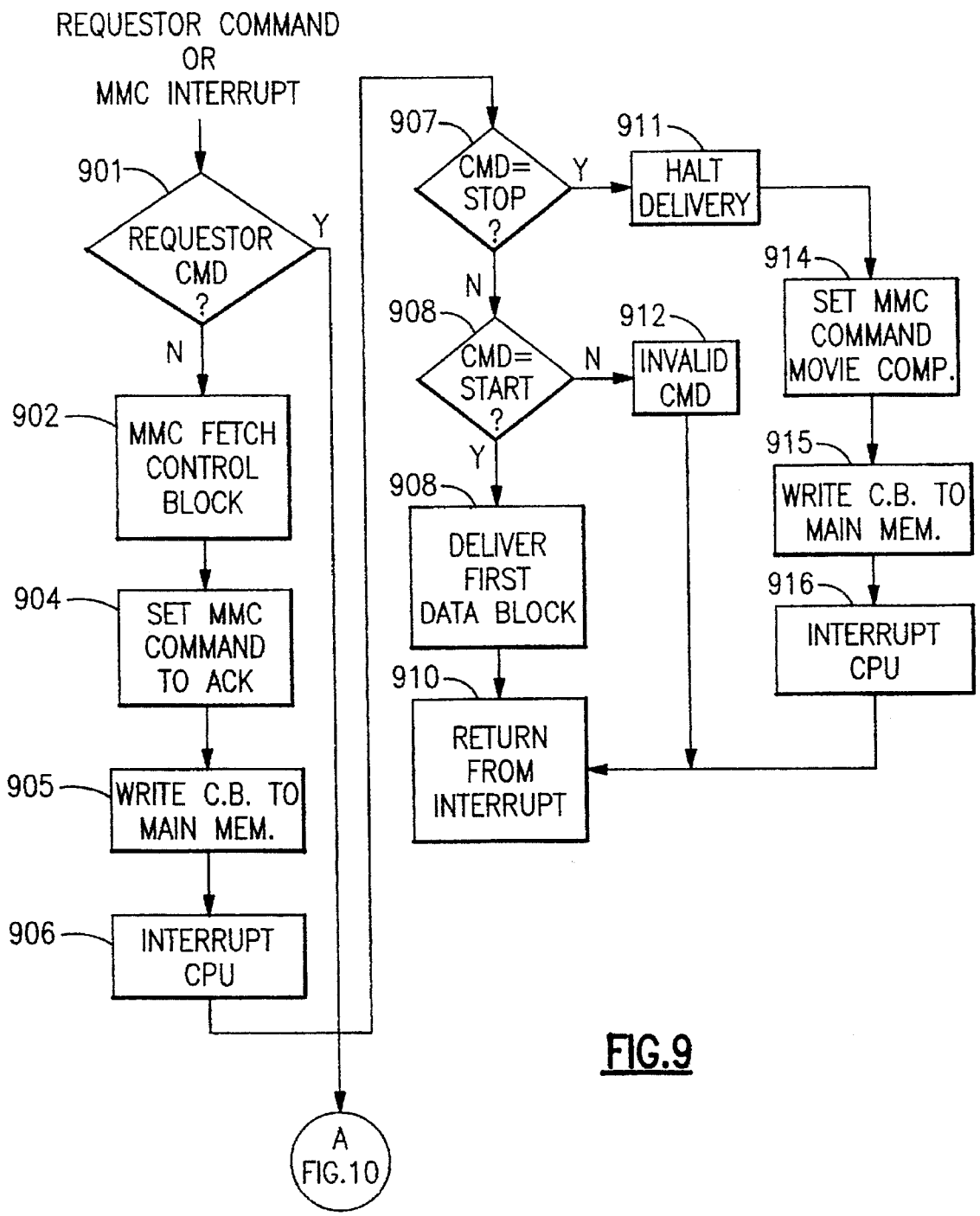
FIGS. 9 and 10 are flow diagrams that represent a process that runs on a MM for controlling the data flow for a movie recorded on a disk to a given STB attached to the network.
Figure 10:
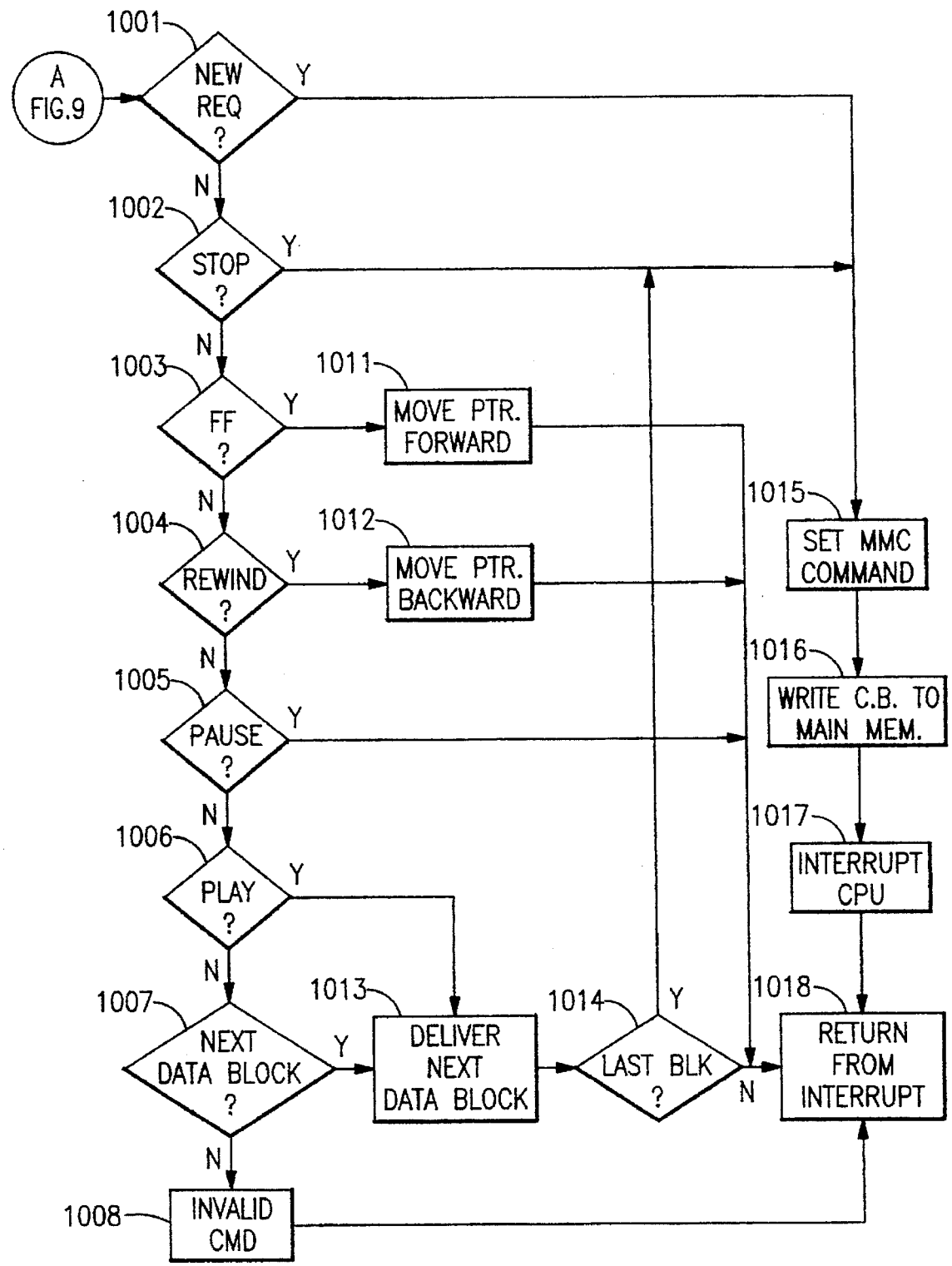

In step 1104 the command control block is then sent over the network to the assigned MMC Processor where the command is serviced by the process shown in FIGS. 9 and 10.

Figure 12:
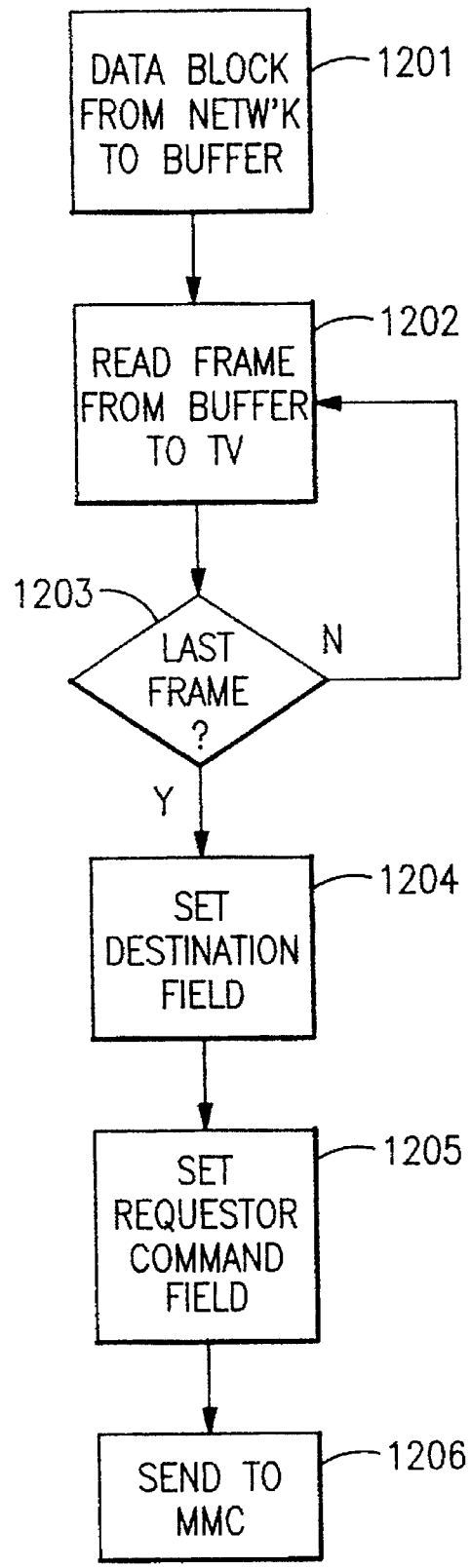

FIG. 12 shows the process performed in any STB to play a received movie on an attached Television (TV) set. The movie being received by an STB plays continuously on the TV set attached to the STB. Step 1201 represents each received data block, which is buffered in the STB as it arrives, and a data block may contain many TV data frames. Each frame of data is then read out of the buffer by step 1202, and step 1203 checks the buffer after each frame to see if it is the last frame of the buffered data block. If not the last frame, a backward loop branch is taken to step 1202 to read the next frame, until all frames are read. If step 1203 detects the last frame of a buffered data block, then steps 1204 through 1206 inform the MMC to send the next data block of the movie until the last frame is detected. Step 1204 sets the Destination field 504 in the control block, step 1205 sets the Requestor Command in field 507, and step 1206 sends the control block to the MMC.

Figure 6:
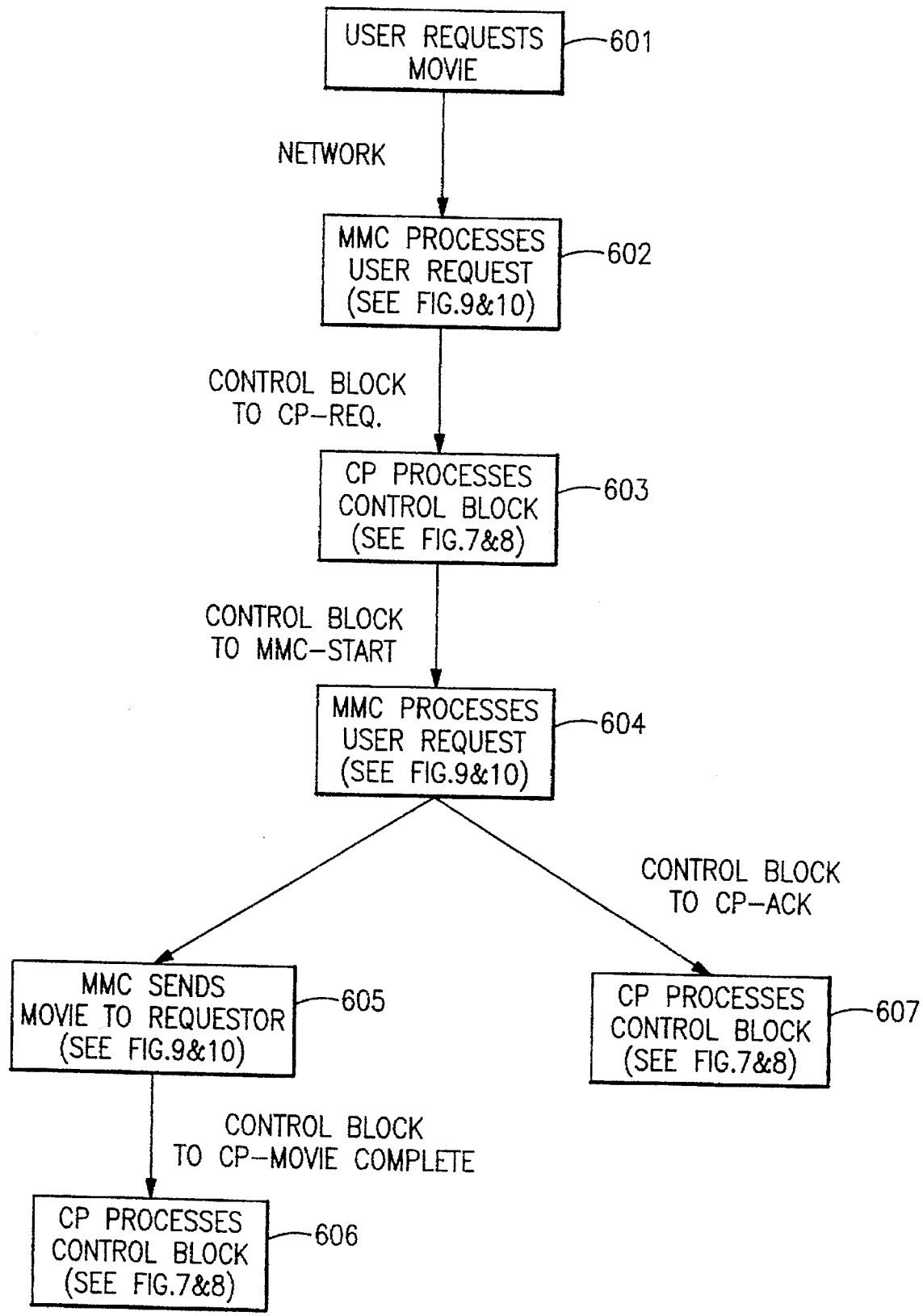
FIG. 6 is an overall flow diagram of the overall process used in the system represented in FIG. 1 for processing each STB request from the network to a MMC for delivery, and for interactive control, of a movie to be viewed, or while being viewed, by a user at a television (TV) set connected to the STB. Details of the flow diagram in FIG. 6 are shown in FIGS. 7 through 10.

FIG. 6 represents the general control process for executing commands in the multimedia controller (MMC) and a host system CPU after a user initiates a command at a STB. In step 601, a user requests an user-identified movie be transmitted to the user's STB, usually by keystrokes to the STB. The STB sends a movie start request as an requestor command through the network to the network adapter 304 to which the STB is currently connected.

Each STB contains a processor which provides a command control block of the type shown in FIG. 5A containing a user request for a movie in the requestor field 507 and the STB inserts a movie identifier in the file identifier field 506 for the desired movie keyed to the STB by the STB user. The STB processor also sets into fields 504 in the command control block, the destination address (the STB network address). The STB then sends the control block as its request to its connected MMC, where the command block is further processed by the MMC in step 602 (shown in detail in FIGS. 9 and 10). The MMC processor receives this control block and acknowledges it by setting field 502 with an acknowledge command, writing the changed control block in its memory, and sending a copy of this block to the requesting STB. The MMC then sends an interrupt signal and a copy of this control block to a CPU 101 for further processing in step 603. A start request does not send movie data to the STB the first time the command is received by the MMC, because the STB has not yet been approved to get the movie.

Figure 7:
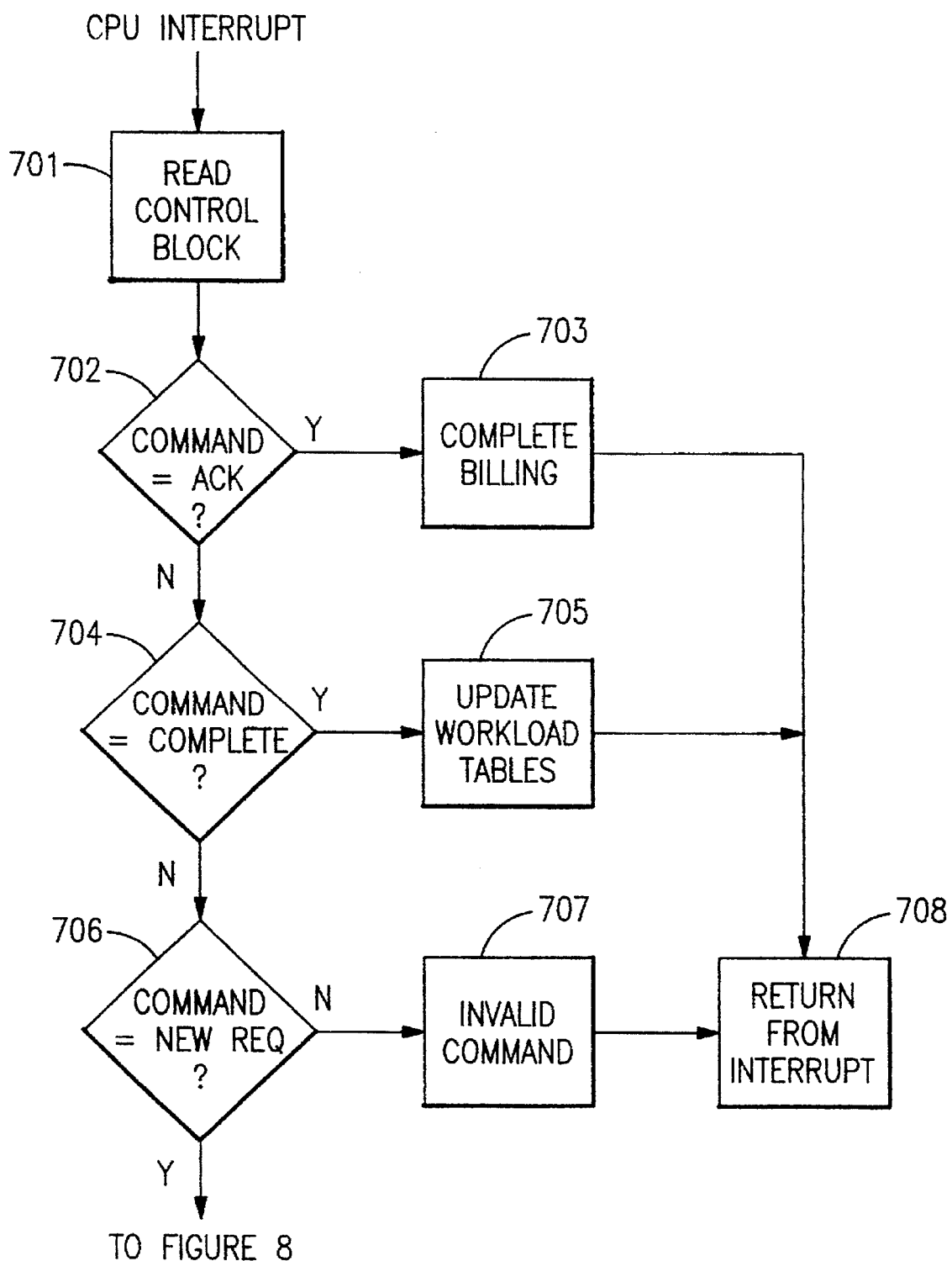
FIGS. 7 and 8 are flow diagrams of processes performed in a host CPU for handling a Multimedia Network System.
Figure 8:
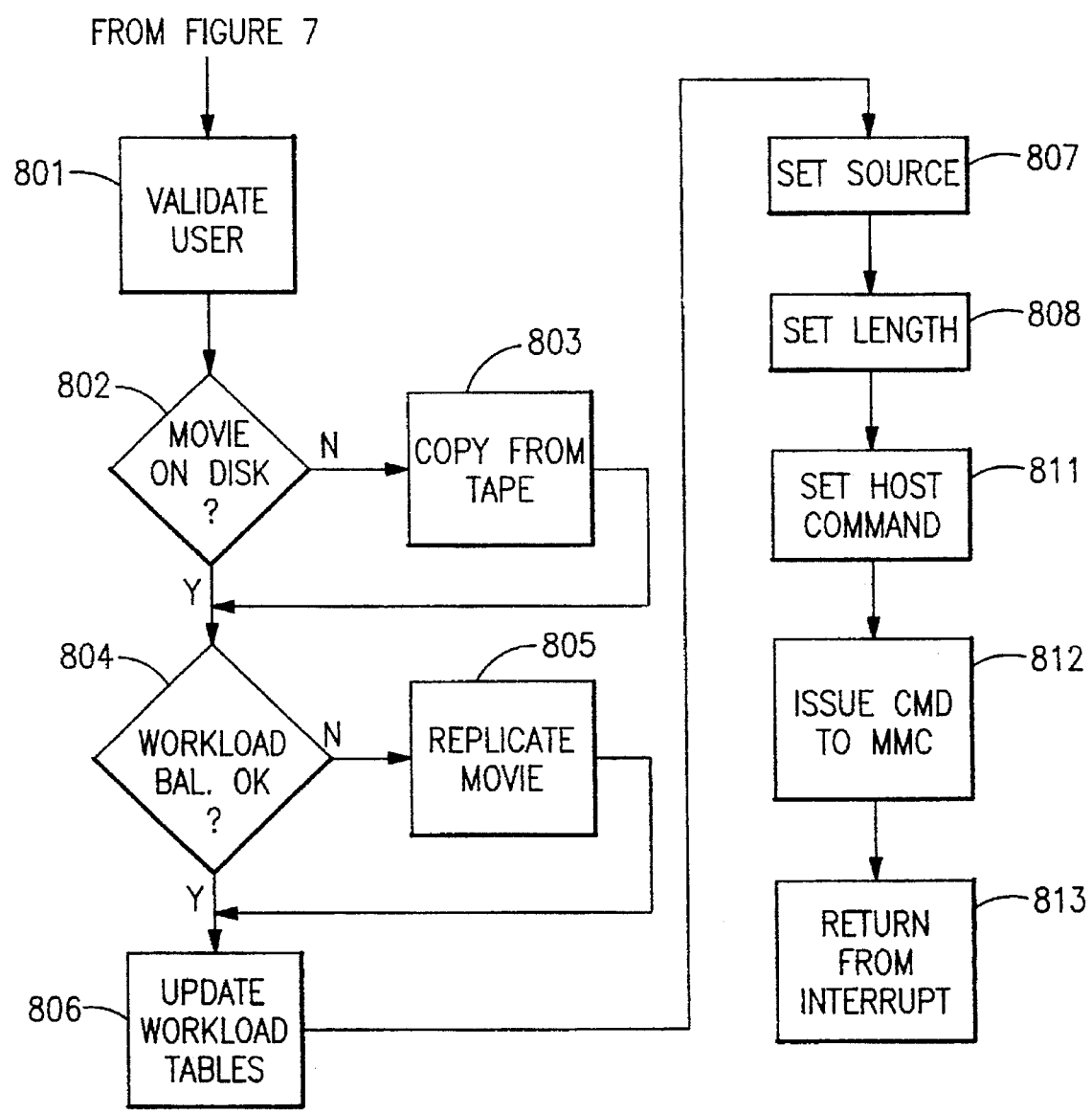

In step 603, the CPU processes the control block using the process shown in FIGS. 7 and 8. In its steps, the CPU validates the STB user (determines his bill is paid, etc.), sets command block source field 503 and file length field 505 after looking up this information in tables in the host main memory 102. Hence, if the CPU finds the movie is not on any of the disks available to the MMC pair 409 handling the STB request, the CPU can copy the movie from tape to an available disk in that MMC pair 409, or the CPU may copy the movie from a disk connected to another MMC pair 409. If the CPU finds the requesting STB is not authorized (such as if its user did not pay prior billings), then the STB request is terminated. If these tests are satisfied, the movie is approved for viewing by the requesting STB, and the CPU then sets the host command field 501 and sends a command interrupt to the MMC which will further process it. The MMC processor then controls the movie data transmission to the STB by going to step 604.

This time through step 604, the process takes path A to FIG. 10 from FIG. 9 and the data transmission is started to the STB. Here, the process also analyzes the control block for more detailed instructions from the user, such as whether this is a VCR type of command (rewind, fast forward, pause, play, stop, etc). If so, the MMC inserts a corresponding MMC command that will be effective to initiate and perform the requested operation at the STB processor. While this is going on the MMC is checking for interrupts from the CPU and from all connected STBs via the network, and concurrently may be doing work for other requests.

In step 605, the movie is sent in a sequence of data blocks, as the STB plays out its current block of data and makes a next command for the next data block of the movie, performed in FIGS. 7 and 8. In step 606, the CPU processes the movie complete command and updates workload tables as shown in FIGS. 7 and 8. In step 607 the CPU processes the acknowledgement (ack) found in the MMC command field in the control block passed from the MMC; this completes the billing for the requested movie. This completes the MMC/CPU operations for this request.

FIG. 7 shows details in the control flow carried out by the host system. When a CPU interrupt is sent from the MMC processor to the CPU, an associated command control block is stored in the main memory of the CPU, and (based upon which valid command it is), its specific functions are carried out.

In step 701 and 702, the MMC command block is read and field 502 is checked to see if it contains an ACK Command. If this is the case, the billing for the request is performed in step 703. This billing is an accounting procedure for billing the user at the destination address in field 504. Once the billing is completed, the CPU returns from the interrupt in step 708 where it returns to its interrupted processing operations, and the CPU may not perform any MMC work until a next interrupt from a MMC.

The MMC signals the CPU when it fetches the last data block of the requested movie which the CPU detects in step 704 (following step 702 finding that the MMC command is not an acknowledge command). If in step 704 the command indicates the movie transmission is complete, the CPU enters step 705 to update its workload tables to balance the workload on the resources in the system, such as the CPUs and the MMCs. After this is done, the CPU processing is completed for the current interrupt, and step 708 causes the CPU to return to its prior processing which it was doing when interrupted for the current multimedia command.

Step 706 checks if the command is a new STB request, which is handle by entering the process in FIG. 8. Only new STB command requests should reach step 706 in this processing path. If it is not a new STB request, then the command is considered invalid and an error must be posted by the CPU and a return from interrupt to step 708 is again taken to indicate to the processor that it should continue its last processing which was interrupted to perform the current command processing. If the command is a new request, the processor continues on to handle this request by going to the process described in FIG. 8.

FIG. 8 shows the CPU control when a Movie Request command is received at the CPU. In the control block for this command, the user has inserted Destination field 504, which is must be validated by step 801. Once this is accomplished, the Movie ID# in field 506 is checked by step 801 to see if the movie resides on a disk. If the movie is not presently on any disk in the MMC pair connected to the requesting STB, then the movie must be copied by step 803 from tape to disk. As soon as the movie exists on a disk controlled by the connected MMC pair 409, the MMC processor can proceed in sending the movie data to the requesting STB; the disk copying operation need not be complete before proceeding to send the movie.

Once it is determined that the movie resides on disk, the host's load balancing tables must be checked by step 804. These tables keep track of the number of users accessing specific movies and the number of copies of each of the movies is being delivered by the respective MMC pairs, so as not to cause any bottleneck in the delivery of new movie requests. If there is not a copy of the movie on a disk able to be used for this request, then the movie must be replicated by step 805 by copying it from a disk controlled by another MMC pair 409. After the CPU has established which MMC disk will deliver the movie, the load balancing tables must be updated by step 806.

Next more fields in the command control block must be set before it can be sent to the selected MMC. This entails writing and copying specific information by steps 807, 808, 811 respectively in source field 503 and in length field 505. Also field 501 is set with the host command (501) to indicate a Start Movie operation. Then step 812 issues the command to the selected MMC, and step 813 returns the processor operations from the current interrupt processing in FIG. 8.

FIG. 9 describes the flow of control within the MMC processor. The MMC processor may be interrupted by either the CPU or an STB request. If the interrupt is signalled by a CPU, the CPU stores the command control block in the CPU memory 102 from which it is fetched by step 902 from CPU main memory 102 to the MMC processor memory 403. Once the control block is read into the MMC memory 403, the MMC must acknowledge that it has received the control block. This is accomplished by step 904 setting the MMC Command field 502 to an ACK indication. Then, the updated control block is written by step 905 to the CPU main memory, and then the CPU is interrupted by step 906 for the CPU to process the command block.

Now the host command field 501 is checked by step 907 for an indication of whether it indicates a stop movie command. If step 907 indicates the command is a stop command, the processing halts any further data delivery operation for the movie to the requesting STB. To do this, step 914 is entered to set a halt operation command in the MMC command field of the control block to indicate the movie transmission is complete, and then step 915 stores the control block in the CPU's main memory, while step 916 send an interruption signal to the host system to look at this control block. The interrupt signal is serviced by a next available host CPU accessing the control block and posting CPU movie management tables to indicate the movie transmission is halted to the receiving STB. Also, the CPU updates host workload balancing tables for maintaining optimum system performance—such as by switching STBs to different MMC pairs 409 when STB requests are being delayed, so that a minimum transmission delay is maintained in the data transmission servicing of the requesting STBs by the different MMC pairs 409.

When step 907 indicates the command is not a stop command, step 908 tests the CPU for being a start command. If step 908 finds it is not a start command, then the host command is other than a stop or start command, and then step 912 indicates it is an invalid host command for the current processing path, and step 910 is entered, which causes it to return to its prior interrupted processing.

When the MMC processor returns from interrupt in step 910, it goes into a wait state to wait for a next interrupt from either a CPU or a STB to start its next processing operation. The wait state may be maintained for the MMC processor by having it enter a wait loop, until it receives a next interrupt signal from a CPU or a STB.

FIG. 10 is a detailed flow diagram of operations in the MMC processor when a request is received from an STB in a command control block along with an accompanying interrupt. Each request is sensed by step 901 in FIG. 9, which takes its yes exit to step 1001 in FIG. 10. Then step 1001 takes its yes exit to step 1015 if the requestor command 507 is a new request in which the MMC processor sets command field 502 in the command control block to request movie; and the following steps 1016 and 1017 write the command control block into host main memory and interrupt a CPU to service it.

If step 1001 finds the command block does not contain a new request, its no exit is taken to step 1002 to test the control block for containing a stop command. If it contains a stop command, then the movie transmission is completed by setting the MMC command field to movie complete to indicate a stop command in the control block. Then steps 1015, 1016 and 1017 operate in the manner previously described the control block is sent to the CPU as previously described to put the MMC processor into wait state to awaits its next interrupt.

If the STB Command is not a start or stop command, step 1003 is entered to test the command block for containing a Fast Forward command in the requestor command field 507. If not a fast forward command, Rewind test step 1004 is entered. If step 1003 finds it contains a fast forward request command, step 1011 moves a pointer (or other indication) to obtain, or generate, a next data block in the transmission of the current movie to the STB. If step 1004 finds it contains a rewind request command, step 1012 moves the pointer (or other indication) backward to obtain, or regenerate, the prior transmitted data block which is then retransmitted to the STB to replay the prior data in the movie. Then step 1018 is entered to put the MMC processor into its wait state as previously explained herein.

If step 1004 finds the control block does not contain a rewind command, step 1005 is entered to test the control block for an STB pause request. If the STB Command has a Pause request, then the MMC processor does not perform any further data transmissions to the STB, and this is done by simply returning the MMC processor to its wait state by entering the return from interrupt step 1018, previously explained herein.

If step 1005 finds the command block does not contain a pause command, step 1006 is entered to test for a play command in requestor command field 507. If no play command is in the block, step 1007 is entered, which looks for a "next data block" command indication in field 507. If either a play command or a next block command is found, step 1013 is entered to cause the next data block to be transmitted on the network to the requesting STB to continue the movie transmission. If step 1014 finds this is not the last block, steps 1018 is executed, as previously described, to put the MMC processor into the wait state.

If step 1014 finds this is the last block, steps 1015 through 1018 are executed to put a movie complete command in MMC command field 502, store the control block in the host main memory, and interrupt the host processor and returns from interrupt.

If step 1007 finds this is not a next data block request command, then the content of the command block has been tested for all possible commands and none has been found. Then an invalid command is being processed, and step 1008 is entered which passes control to step 1018 that puts the MMC processor into a wait state.

It should be understood that the embodiment described herein has been provided by way of example and not by way of limitation. In light of the foregoing description, many modifications and variations which do not depart from the scope and spirit of the invention is defined by the appended claims.

Having thus described our invention, what we claim as new and desire to secure by Letters Patent is:

1. A hierarchical multimedia (MM) distribution system for supporting "on demand" control of graphical data files being received by viewing-control devices connected to a network, comprising:

a host computer system for monitoring the MM distribution system, the MM distribution system comprised of a plurality of MM adapters connected to the host computer system, each MM adapter containing one or more MM controllers, each MM controller containing a controller bus connected to an MM processor, one or more MM pairs connected to the controller bus, each MM pair including a disk adapter and a network adapter, the disk adapter connected to one or more disk drives for receiving data blocks read from selected disk drives, graphical data files being stored on the disks, and data blocks in a requested data file being read directly from each selected disk to the disk adapter, a pair bus in each MM pair for directly receiving the data blocks received by the disk adapter and for directly transmitting the data blocks to the network adapter, the network adapter in each MM pair directly distributing the data blocks from the pair bus to the network, each data block being addressed to any viewing-control device requesting a data file containing the data block, and means in each viewing-control device for issuing interactive commands through the network to the network adapter to control characteristics of data reception of the requested data file being transmitted to each viewing-control device.

2. A hierarchical multimedia (MM) distribution system for supporting "on demand" control of graphical data files being received by viewing-control devices connected to a network as defined in claim 1, the command means at a viewing-control device comprising means for generating a control block having a field for containing a command being requested by the viewing-control device, and means for sending the control block through the network to the connected network adapter and transferring the control block to an associated MM processor for the MM processor to receive the command.

3. A hierarchical multimedia (MM) distribution system for supporting "on demand" control of graphical data files being received by viewing-control devices connected to a network as defined in claim 1, further comprising the viewing-control devices being set-top-boxes (STBs) connected to viewing devices respectively comprising television (TV) sets, and commands being keyed into the STBs by viewers of the TV sets.

4. A hierarchical multimedia (MM) distribution system for supporting "on demand" control of graphical data files being received by viewing-control devices connected to a network as defined in claim 1, further comprising at least some of the graphical data files containing both audio and visual information.

5. A hierarchical multimedia (MM) distribution system for supporting "on demand" control of graphical data files being received by viewing-control devices connected to a network as defined in claim 2, further comprising movies comprising at least some of the graphical data files.

6. A hierarchical multimedia (MM) distribution system for supporting "on demand" control of graphical data files being received by viewing-control devices connected to a network as defined in claim 1, further comprising I/O channels in the host computer system connecting a MM adapter bus to the host computer memory, commands from any viewing-control device being sent to the network adapter and forwarded to the connected MM processor for processing.

7. A hierarchical multimedia (MM) distribution system for supporting "on demand" control of graphical data files being received by viewing-control devices connected to a network as defined in claim 2, further comprising a start command being interpreted by the MM processor and forwarded to the host computer system for determining authorization by the viewing-control device to receive a data file requested by the start command, and the host computer system signalling the MM processor that the requested data file is not to be sent to the requesting viewing-control device.

8. A hierarchical multimedia (MM) distribution system for supporting "on demand" control of graphical data files being received by viewing-control devices connected to a network as defined in claim 2, further comprising a start command received by the MM processor and transferred to the host computer system for determining authorization by the viewing-control device to receive a data file requested by the start command, and the host computer system signalling the MM processor that the requested data file is to be sent to the requesting viewing-control device because an attached viewing device is found authorized to receive the data file.

9. A hierarchical multimedia (MM) distribution system for supporting "on demand" control of graphical data files being received by viewing-control devices connected to a network as defined in claim 8, further comprising a stop command being processed by the MM processor and forwarded to the host computer system for processing transmission-termination information for the viewing-control device, and the host computer system signalling the MM processor to stop reading and sending blocks of the requested data file to the viewing-control device.

10. A hierarchical multimedia (MM) distribution system for supporting "on demand" control of graphical data files being received by viewing-control devices connected to a network as defined in claim 2, further comprising a next-block command being sent by the viewing-control device to the MM processor before a last block received by the viewing-control device has been completely transmitted by the viewing-control device to a TV set, and the MM processor responding to the next-block command by transmitting any next block in the data file for reception by the viewing-control device before the last block has been completely transmitted by the viewing-control device to the TV set.

11. A hierarchical multimedia (MM) distribution system for supporting "on demand" control of graphical data files being received by viewing-control devices connected to a network as defined in claim 2, further comprising a next-block command being sent by the viewing-control device to the MM processor to request a next data block when each data block is received and stored in a buffer at the viewing-control device while a last-received data block is being read and processed by the viewing-control device from another buffer.

12. A hierarchical multimedia (MM) distribution system for supporting "on demand" control of graphical data files being received by viewing-control devices connected to a network as defined in claim 10 or 11, further comprising the MM processor testing for no last block being available from the data file in response to receiving each next-block command as part of the processing of the command by the MM processor, and the MM processor inserting a data file end signal in the command and sending the command to the host computer system for termination processing of the data file for the viewing-control device.

13. A hierarchical multimedia (MM) distribution system for supporting "on demand" control of graphical data files being received by viewing-control devices connected to a network as defined in claim 2, further comprising a viewing-control command being sent by the viewing-control device to the MM processor to request a change in the viewing presentation at the viewing-control device, and the MM processor controlling a selected disk to select the next block in a data file to be sent to the viewing-control device according to a control indication put in the command-control block by the viewing-control device.

14. A hierarchical multimedia (MM) distribution system for supporting "on demand" control of graphical data files being received by viewing-control devices connected to a network as defined in claim 13, further comprising a fast-forward command indication being provided in a command control block sent to the MM processor as the viewing-control command, the MM processor receiving the fast-forward command and controlling a selection of a forward data block by forward incrementing the data file by a predetermined number of data blocks from a last data block transmitted to the viewing-control device, and the MM processor continuing transmission of the data file to the viewing-control device from the forward data block.

15. A hierarchical multimedia (MM) distribution system for supporting "on demand" control of graphical data files being received by viewing-control devices connected to a network as defined in claim 13, further comprising a fast-backward (rewind) command indication being provided in a command control block sent to the MM processor as the viewing-control command, the MM processor receiving the fast-backward command and controlling a selection of a backward data block by backward incrementing the data file by a predetermined number of data blocks from a last data block transmitted to the viewing-control device, and the MM processor continuing transmission of the data file to the viewing-control device from the backward data block.

16. A hierarchical multimedia (MM) distribution system for supporting "on demand" control of graphical data files being received by viewing-control devices connected to a network as defined in claim 13, further comprising a pause command indication being provided in a command control block sent to the MM processor as the viewing-control command, the MM processor receiving the pause command terminating further transmission of any data block in the data file to the viewing-control device until a no-pause command is received from the viewing-control device, and the viewing-control device repeating a reading of data from a buffer for a last picture displayed by an associated viewing device.

* * * * *